Feb. 16, 1954 W. S. RIAL 2,669,712

DUAL CHANNEL RECEIVER

Filed Feb. 27, 1951

3 Sheets-Sheet 1

INVENTOR.
Wayne Scott Rial
BY Victor J. Evans & Co.
ATTORNEYS

INVENTOR.
Wayne Scott Rial
BY Victor J. Evans & Co.
ATTORNEYS

Feb. 16, 1954 W. S. RIAL 2,669,712

DUAL CHANNEL RECEIVER

Filed Feb. 27, 1951 3 Sheets-Sheet 3

INVENTOR.

Wayne Scott Rial

BY Victor J. Evans & Co.

ATTORNEYS

Patented Feb. 16, 1954 2,669,712

UNITED STATES PATENT OFFICE 2,669,712

DUAL CHANNEL RECEIVER

Wayne S. Rial, Batavia, N. Y.

Application February 27, 1951, Serial No. 212,874

4 Claims. (Cl. 343—206)

The present invention relates to radio receiver systems of the superheterodyne type and more particularly to a dual channel superheterodyne receiver for receiving two radio signals transmitted on two different carrier wave channels of communication.

An object of the invention is the provision of a superheterodyne receiver system capable of operating in effect as two separate independently tuned receivers for concurrent reception of two different signals transmitted on two different carrier frequencies, reproducing the different signals at different points independently of each other.

Another object is to provide a receiver of the above type in which both signals are processed in part in common circuits, thereby economizing in equipment, adjustments and servicing.

Another object is to provide a novel multivibrator system having four output circuits for gating four different portions of the receiver in synchronism.

Various other objects and advantages of the invention will become apparent from the following description read in connection with the attached drawings showing schematically certain preferred embodiments of the invention.

In the drawings, Fig. 1 is a block diagram showing the relation of the main component groups used in the system.

Figures 1, 2:
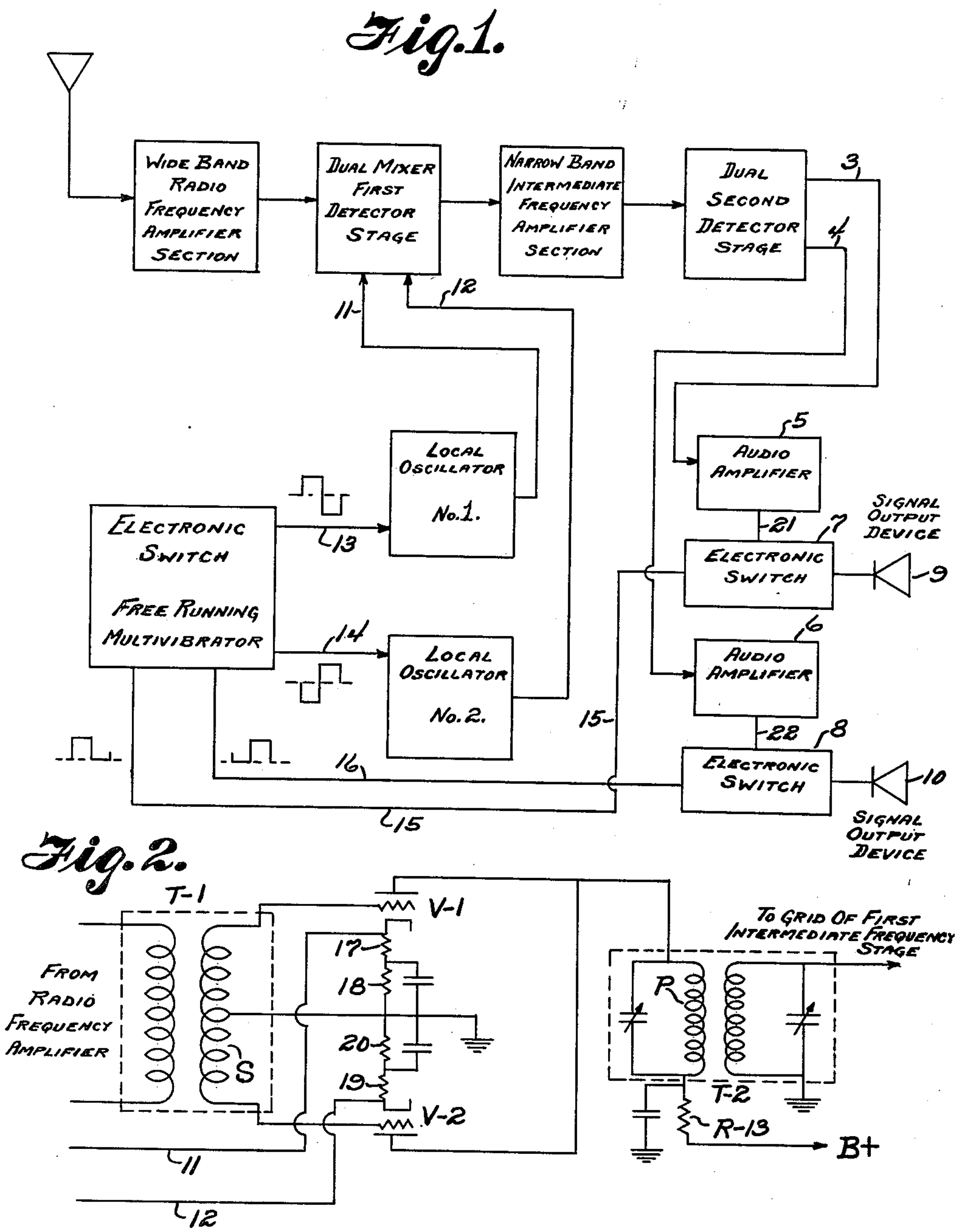
Fig. 2 is a detail circuit diagram of a dual mixer, first detector stage and its connection to a conventional intermediate frequency amplifier component.

Referring to the drawings in detail and first to Fig. 1, here is shown a wide band radio frequency amplifier section common to both signal channels or carrier waves to be processed for reception of the two different signals carried thereon. A dual mixer first detector stage continues the connection to a narrow band I. F. amplifier common to both signal channels. A dual second detector stage connects the I. F. amplifier through two output circuits 3 and 4, to two audio amplifier sections 5 and 6 respectively, one for each signal channel. Each audio amplifier is connected through a gating electron switch 7 and 8 respectively, to individual signal output devices 9 and 10 here indicated diagrammatically as loud speakers but which may be any known or other suitable kind of signal indicator or recorder.

For selection of the two carrier waves to be processed, a pair of tunable local oscillators No. 1 and No. 2 are provided having their output circuits 11 and 12 connected to a pair of suitable input points in the dual first detector stage. A free running multivibrator has a pair of square wave, 180° out of phase, oscillator gating circuits 13 and 14 in gating control connection one with each of the local oscillators, and a second pair of gating circuits 15 and 16 carrying square wave unidirectional pulses in staggered phase relation as indicated, said circuits leading to the pair of electron switches 7 and 8 for alternately switching the outputs of the audio amplifiers 5 and 6, to the signal output devices 9 and 10.

While the various functional components above may in general be of any conventional form certain usable forms are shown more in detail in the following circuit diagrams. The wide band radio frequency amplifier section may be of any known or other suitable type, capable of amplifying all the carrier frequencies of the band of carrier channels, a selected two of which are to be processed for reception of their carried signals. The dual mixer, first detector circuit is preferably that shown in Fig. 2 utilizing two triodes V-1 and V-2 having their control grids connected in push-pull to the split secondary windings of the output transformer T-1 of the wide band radio amplifier, which latter as above stated may be of any known or other suitable form. Where the radio frequency amplifier is of a multi-stage type, the transformer T-1 would of course be that of the last stage. The output or anode circuits of the triodes V-1 and V-2 are connected in parallel through the primary winding P of the input transformer T-2 of a conventional I. F. component, and a voltage dropping resistance R-13, to the positive terminal B+ of a suitable high voltage source with negative terminal, not shown, grounded as usual. To complete the output circuits of the triode tubes, their cathodes are each connected to ground through pairs of series resistances 17—18 and 19—20 respectively, the resistances nearest ground being shunted by by-pass condensers as usual, while the resistances nearest the cathode act as coupling resistors for input to the cathodes from the local oscillators.

Figure 3:
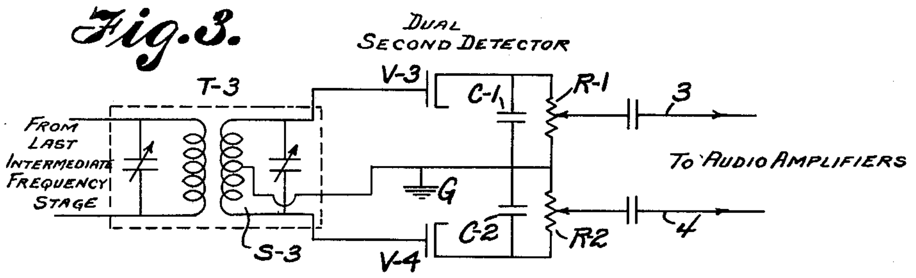
Fig. 3 is a circuit diagram of a dual second detector stage linking the last stage of the I. F. amplifier with two separate conventional audio amplifier components.

The transformer T-2 represents the tuned transformer of the first stage of a conventional narrow band multi-stage I. F. amplifier, which may be of any known or other suitable form, not shown. The output or last stage of such amplifier as indicated in Fig. 3, is coupled through a tuned output transformer T-3 to the dual second detector comprising the two diode tubes V-3 and V-4. The secondary winding S-3 of this transformer is center tapped with the center terminal connected to ground or other common return circuit connection indicated at G, while its two outer terminals are connected to the anodes of the diode tubes V-3 and V-4 respectively. The diode circuits are completed to ground each by a connection from its cathode to ground through a load resistance R-1 and R-2 shunted by by-pass condensers C-1 and C-2 respectively. A pair of audio output circuits 3 and 4 lead from adjustable taps on the load resistances R-1 and R-2 through coupling condensers to the two separate audio amplifier sections 5 and 6, respectively, shown in block diagram in Fig. 1 and which it is to be understood may be of any known or other suitable type.

Figure 4:
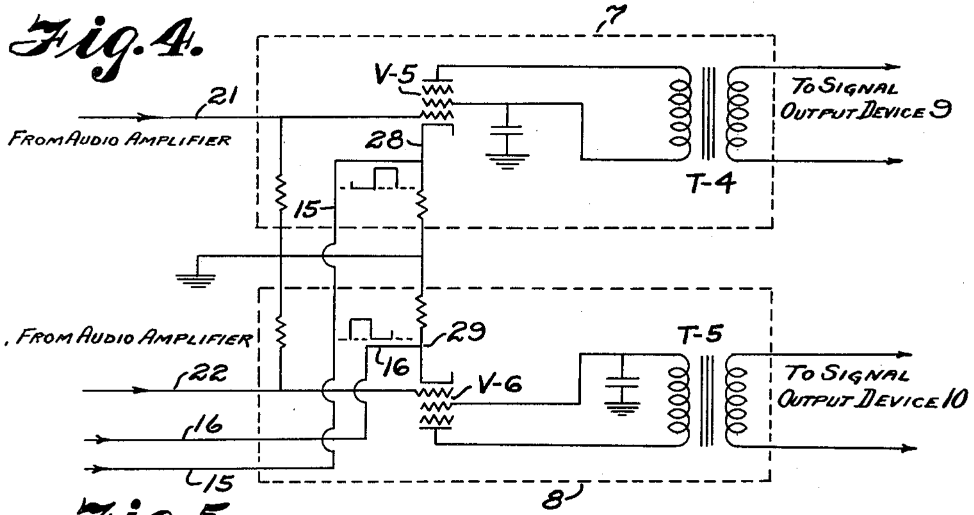
Fig. 4 is a circuit diagram of the pair of synchronized electron switches gating the outputs of the audio amplifier components to the audio output elements.

As indicated in Fig. 4, conductors 21 and 22 constituting the two output conductors of the audio amplifier sections 5 and 6 respectively, lead through electron switches 7 and 8 comprised of the two pentode tubes V-5 and V-6, with output audio transformers T-4 and T-5, to the audio signal devices 9 and 10 respectively.

Figure 5:
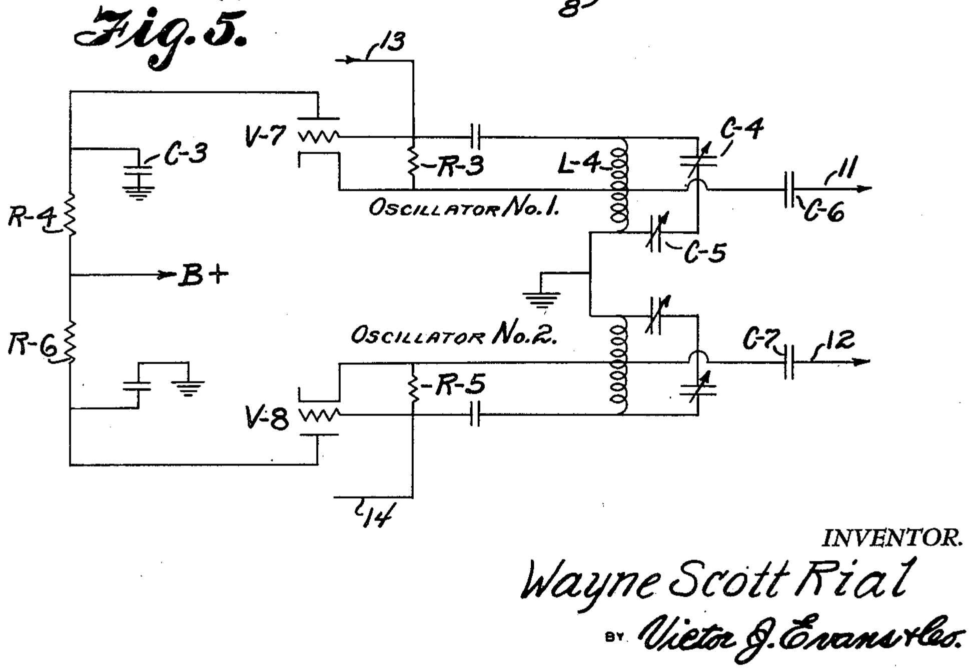
Fig. 5 is a circuit diagram of the oscillators, their coupling to the first detector mixer, and to their synchronized gating-pulse circuits.

The local oscillators, No. 1 and No. 2 shown more in detail in Fig. 5 are identical and of generally conventional type. Here for example oscillator No. 1 is comprised of the triode V-7 having the plate by-passed to ground through the by-pass condenser C-3; the grid connected to ground through the tunable parallel L-C circuit consisting of inductance L-4 and capacitor C-4, and the cathode connected to a tap on the coil L-4. A grid leak R-3 connects the grid and cathode, while a grid condenser couples the grid to the ungrounded terminal of the inductance coil L-4. A trimming condenser C-5 is inserted in series with the main tuning condenser C-4. The positive terminal B+ of a suitable high voltage supply, not shown, is connected through a voltage dropping resistance R-4.

Similarly, the local oscillator No. 2 is comprised of the triode tube V-8 with cooperating parts and components duplicating all those associated with oscillator No. 1 connected in identical manner as described above in connection with oscillator No. 1. Gating or keying circuit conductors 13 and 14 for the oscillator No. 1 and No. 2 respectively, connected each to the grid of its respective oscillator, serve to key their respective oscillators to maintain oscillations during the positive phase of a square voltage wave transmitted to the grid of the triode and to prevent oscillation during the negative phase of the square wave. As will hereinafter appear, the square voltage waves over conductors 13 and 14 will be in synchronism but 180° out of phase. A pair of output circuit conductors 11 and 12 lead from the cathode of tubes V-7 and V-8 of the No. 1 and No. 2 oscillators through coupling condensers C-6 and C-7 respectively, to the cathodes of the triodes V-1 and V-2 of the dual mixer first detector of Fig. 2. Thus as the No. 1 and No. 2 oscillators are alternatively actuated their outputs of two different frequencies are alternately applied to the first dual mixer detector to alternately beat with each of the two selected channels to produce the common beat frequency output alternately carrying first the signal of the one channel and then the signal of the other channel.

Figure 6:
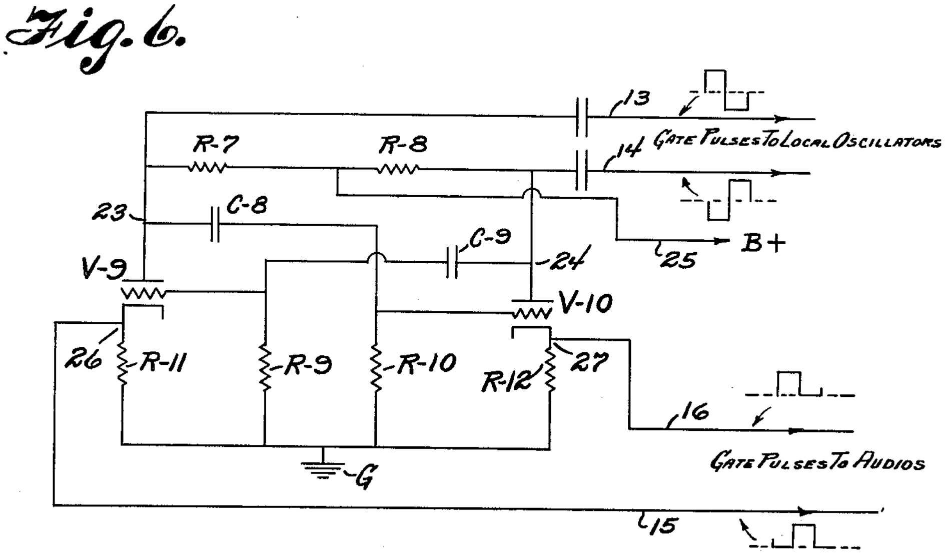
Fig. 6 is a circuit diagram of the free running multibibrator with its four synchronized output circuits.

The square wave voltage or pulses supplied to the oscillators over the conductors 13 and 14 are produced by the free running multivibrator shown schematically in Fig. 6. As here shown it is of generally classic construction comprising a pair of triode tubes V-9 and V-10 arranged as a pair of cross-connected resistance-coupled amplifiers, the output or anode terminal 23 of V-9 being coupled to the input or grid terminal of V-10 by way of a connection from the anode terminal 23 through grid condenser C-8. Similarly the output or anode terminal 24 of V-10 is coupled to the grid of tube V-9 by way of a connection from the anode terminal 24 of tube V-10 through grid condenser C-9. Anode resistances R-7 and R-8 connect the anodes of V-9 and V-10 respectively to the common high voltage supply conductor 25 connected to the positive terminal of the high voltage supply indicated at B+. Grid leak resistances R-9 and R-10 and cathode resistances R-11 and R-12 connect their respective grids and cathodes to the common ground return indicated at C, to which common ground, it will be understood, the minus terminal of the above mentioned high voltage source is connected.

Outputs for the square wave voltages transmitted over conductors 13 and 14 to the oscillators are taken from the anode terminals 23 and 24. A second pair of pulse transmitting output circuits 15 and 16 lead from the cathode terminals 26 and 27 to the cathode terminals 28 and 29 of the tubes V-5 and V-6 of the electron switches 7 and 8, respectively, of Fig. 4.

These pulses being in the cathode follower circuit are square wave unidirectional pulses, those in the different output conductors 15 and 16 being in staggered time phase relation as indicated on the diagram and in synchronism with the square wave voltages transmitted over conductors 13 and 14 to the local oscillators. The outputs of the two audio amplifiers are thus alternately switched on through their respective output transformers T-4 and T-5 to their respective signal output devices 9 and 10. As this switching takes place in synchronism with the keying of the local oscillators, the two different signals of the carriers alternately selected by the oscillators will appear each at one only of the output devices 9 and 10.

Figure 7:
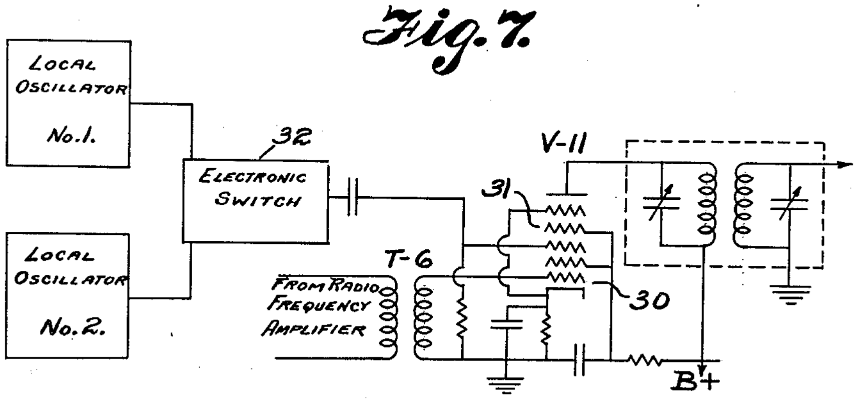
Fig. 7 is a circuit diagram of a single tube mixer circuit using a single input for both oscillators.

A modified first detector or mixer circuit using a single tube and which may be substituted for the dual first detector of Fig. 2, is shown in Fig. 7. This makes use of a single pentagrid tube V-11 receiving on its first grid 30, the radio frequency carrier from an output transformer T-6 of a wide band radio frequency amplifier, not shown. The two local oscillations for selecting the desired signal carrier waves are applied alternately to the third grid 31 from the local oscillators No. 1 and No. 2 through an electronic switch 32 shown in block diagram and which may be of any known or other suitable form, operated in synchronism with the audio amplifier switches 7 and 8.

Figure 8:
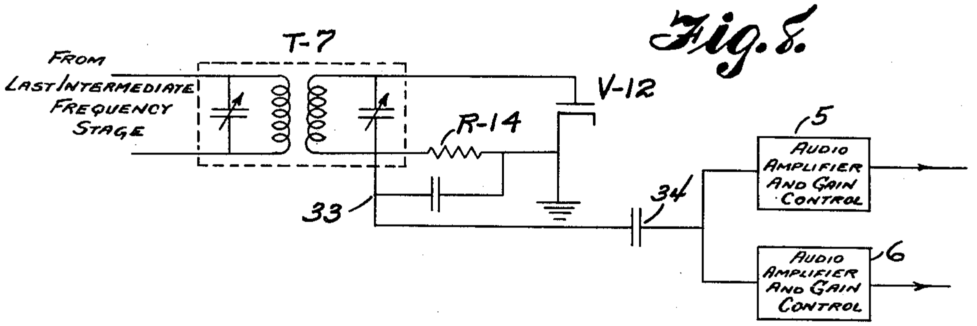
Fig. 8 is a circuit diagram of a single tube second stage and its coupling to the I. F. amplifier and synchronously gated audio amplifiers.

A modified second detector which may be substituted for the dual second detector of Fig. 3, is shown in Fig. 8. This makes use of a single diode tube V–12 having its anode connected to one terminal of the secondary winding of the tuned output transformer T–7 of an intermediate frequency state, and its grounded cathode connected through a condenser shunted coupling resistance R–14. Output is taken from the junction point 33 of the resistance and condenser with the terminal of the transformer T–7 through a coupling capacitor 34 and applied in parallel connection to suitable audio amplifiers 5 and 6.

While I have limited the description of my invention to certain specific forms thereof for the sake of disclosure, it is to be understood that the scope of the invention is not to be restricted to such specific forms but contemplates all such modifications and variations thereof as fall fairly within the scope and purview of the appended claims.

What is claimed is:

1. A dual superheterodyne receiver comprising a wide band receiver, a first detector having an input circuit connected to the output circuit of the radio receiver, a pair of local oscillators of different frequencies coupled to an input circuit of said first detector, an intermediate frequency amplifier connected to the output of said first detector, a second detector having its input circuit connected to the output circuit of the intermediate frequency amplifier, a pair of audio frequency amplifiers having their input circuits connected to the output of said second detector, a pair of audio signal receivers one for each audio amplifier, and means for alternately keying said local oscillators and alternately operatively connecting said audio amplifiers to their respective audio signal receivers in synchronism with the keying of the local oscillators, whereby the signal selected by one oscillator is received at one audio receiver only and the signal selected by the other oscillator is received by the other audio receiver only.

2. A dual superheterodyne receiver comprising a wide band radio receiver, a dual first detector comprised of a pair of triodes each having an input circuit connected in push-pull to the output of said radio receiver, a pair of tunable local oscillators having their output circuits operatively connected to an input circuit of said first dual detector, a pair of gating circuits, one for each oscillator, a tuned intermediate frequency circuit, the output circuit of said dual first detector being connected in parallel to the input circuit of said intermediate frequency circuit, a second detector circuit having its input connected to the output of said intermediate frequency circuit, a pair of audio amplifiers having their input circuits connected to the output of said second detector circuit, a pair of electron switches, one for the output of each audio amplifier, a pair of audio receiver devices each operatively connected with one of said audio amplifiers through one of said electron switch tubes, a pair of gating circuits for each switch tube, and a multivibrator comprised of two cross connected triode amplifiers, each having a plate output circuit and a cathode follower output circuit, said plate circuits being connected to said oscillator gating circuits and said cathode follower circuits connected to said gating circuits for the electron switch tubes, whereby the one multivibrator circuit controls the four gating circuits in synchronism.

3. A dual superheterodyne receiver comprising a wide band radio receiver, a first detector connected to the output of said radio receiver, a pair of tunable local oscillators having their output circuits connected to the said first detector, a pair of gating circuits one for each oscillator, a tuned intermediate frequency circuit, the output circuit of said first detector being connected to the input circuit of said intermediate frequency circuit, a second detector circuit having its input connected to the output of said intermediate frequency circuit, a pair of audio amplifiers having their input circuits connected to the output of said second detector circuit, a pair of electron switches one for the output of each audio amplifier, each switch comprised of an electron tube having an anode, cathode and control grid, the grid of each tube being connected to the output circuit of one of said audio amplifiers, a grid leak for each of said control grids connecting its grid to ground, a pair of audio receiver devices each operatively connected with the anode circuit of one of the said electron switch tubes, a coupling resistance for the cathode of each switch tube connecting its cathode to ground, a pair of gating circuits for each switch tube each connected to the cathode of its tube, a multivibrator comprised of a pair of cross connected triode amplifiers each having a plate output circuit and a cathode follower output circuit, said plate circuits being connected to said oscillator gating circuits and said cathode follower circuits connected to said gating circuits for the electron switch tubes, whereby the one multivibrator circuit controls the four gating circuits in synchronism.

4. A dual superheterodyne receiver comprising a wide band radio receiver, a dual first detector comprised of a pair of triodes having their control grids connected in push pull to the output of said radio receiver, a pair of resistance elements for each triode connected in series between the cathode and ground, a by-pass condenser for the resistance element nearest ground in each pair, a pair of tunable local oscillators having their output circuits connected each to one of the cathodes of the said dual first detector, a pair of gating circuits one for each oscillator operable to maintain oscillation during imposition thereon of the positive phase of a square wave and to block oscillation during the negative phase, a tuned intermediate frequency circuit, the output circuits of said dual first detector being connected in parallel to the input circuit of said intermediate frequency circuit, a second detector circuit having its input connected to the output of said intermediate frequency circuit, a pair of audio amplifiers having their input circuits connected to the output of said second detector circuit, a pair of electron switches one for the output of each audio amplifier, each switch comprised of an electron tube having an anode, cathode and control grid, the grid of each tube being connected to the output circuit of one of said audio amplifiers, a grid leak for each of said control grids connecting its grid to ground, a pair of audio receiver devices each operatively connected with the anode circuit of one of the said electron switch tubes, a coupling resistance for the cathode of each switch tube connecting its cathode to ground, a pair of gating circuits for each switch tube each connected to the cathode of its tube, a multivibrator comprised of a pair of cross connected triode amplifiers each having a plate output circuit and a cathode follower output circuit, said plate circuits being connected to said oscillator gating circuits and said cathode follower circuits connected to said gating circuits for the electron switch tubes, whereby the one multivibrator circuit controls the four gating circuits in synchronism.

WAYNE S. RIAL.

References Cited in the file of this patent

UNITED STATES PATENTS

| Number | Name | Date |
|---|---|---|
| 1,951,524 | Nicolson | Mar. 20, 1934 |
| 2,092,442 | Colwell | Sept. 7, 1937 |
| 2,295,383 | Carlson | Sept. 8, 1942 |
| 2,419,984 | Boothroyd | May 6, 1947 |
| 2,427,191 | Brink | Sept. 9, 1947 |
| 2,448,336 | Weiner | Aug. 31, 1948 |
| 2,460,900 | Newbold | Feb. 8, 1949 |
| 2,491,387 | Miller | Dec. 13, 1949 |
| 2,534,233 | Cleeton | Dec. 19, 1950 |